US006317698B1

(12) United States Patent
Prakash et al.

(10) Patent No.: US 6,317,698 B1
(45) Date of Patent: Nov. 13, 2001

(54) OBSERVER FOR TRANSFER CASE FAULT DETECTION IN A FOUR-WHEEL DRIVE SYSTEM

(75) Inventors: Rajiva Prakash, Canton; Vincent Frank Amatangelo, Northville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/286,920

(22) Filed: Apr. 6, 1999

(51) Int. Cl.$^7$ .......................... G06F 19/00; B60K 23/00
(52) U.S. Cl. .................. 702/94; 701/54; 701/69; 477/107; 180/248
(58) Field of Search .................. 702/94–95, 90–91, 702/104; 701/53–54, 62–63, 69; 180/197–198, 248; 477/107–109, 77–79

(56) References Cited

U.S. PATENT DOCUMENTS

| | | |
|---|---|---|
| 4,664,217 | 5/1987 | Welch et al. . |
| 4,846,010 | 7/1989 | Fujikawa et al. . |
| 5,033,575 | 7/1991 | Takeshita et al. . |
| 5,092,188 * | 3/1992 | Fujikawa et al. ............... 701/69 |
| 5,150,637 | 9/1992 | Ninomiya et al. . |
| 5,170,343 | 12/1992 | Matsuda . |
| 5,212,640 | 5/1993 | Matsuda . |
| 5,215,161 | 6/1993 | Kobayashi . |
| 5,226,860 | 7/1993 | Baxter, Jr. et al. . |
| 5,323,871 | 6/1994 | Wilson et al. . |
| 5,377,127 | 12/1994 | Gibson et al. . |
| 5,400,866 | 3/1995 | Wilson et al. . |
| 5,409,429 | 4/1995 | Showalter et al. . |
| 5,507,704 | 4/1996 | Lasoen . |
| 5,520,590 | 5/1996 | Showalter et al. . |
| 5,522,776 * | 6/1996 | Alvey .................................. 477/35 |
| 5,582,263 | 12/1996 | Varma et al. . |
| 6,101,439 * | 8/2000 | Cutting et al. ................... 701/54 |
| 6,125,317 * | 9/2000 | Prakash et al. .................. 701/69 |
| 6,140,916 * | 10/2000 | Stollsteimer et al. ........... 340/456 |

* cited by examiner

*Primary Examiner*—Marc S. Hoff
*Assistant Examiner*—Bryan Bui
(74) *Attorney, Agent, or Firm*—Ford Global Technologies, Inc.

(57) ABSTRACT

A system and method are provided for detecting faults in an encoder used for position feedback as part of a transfer case in an electronic-shift 4×4 vehicle. Encoder signal failures including open-circuit, short-to-ground, and short-to-power faults and encoder power line failure with open-circuit or short-to-ground fault are detected. The methodology ensures that no fault is set due to transients seen immediately after the power-set up in the system or after turning a relay off at the end of a shift. If the relays are off and an intermittent physical fault changes the encoder code, the fault flag is reset by the methodology when the fault disappears. The physical encoder faults which are transparent from the encoder code in stationary motor are detected by an intelligent recursive index-based algorithm which works when a shift is commanded. The index is increased geometrically when successive invalid codes are received, is increased by a fixed parameter when an out-of-sequence code is received, and is decreased by another fixed value when a proper anticipated code is received. This algorithm is designed and tuned to filter out quick, transient failures, and sets the fault flag when the severity of the failure warrants.

22 Claims, 6 Drawing Sheets

| Enc_Chnl_P | Enc_Chnl_B | Enc_Chnl_C | Enc_Chnl_A | Decimal Equ. [P B C A] | Enc_Pos |
|---|---|---|---|---|---|
| Gnd (1) | Vbat (0) | Gnd (1) | Vbat (0) | 10 | 4L |
| Vbat (0) | Vbat (0) | Gnd (1) | Vbat (0) | 2 | BG4 |
| Vbat (0) | Gnd (1) | Gnd (1) | Vbat (0) | 6 | BG3 |
| Gnd (1) | Gnd (1) | Gnd (1) | Vbat (0) | 14 | N |
| Vbat (0) | Gnd (1) | Gnd (1) | Vbat (0) | 6 | BG3 |
| Vbat (0) | Gnd (1) | Vbat (0) | Vbat (0) | 4 | BG2 |
| Gnd (1) | Gnd (1) | Vbat (0) | Vbat (0) | 12 | 4H |
| Vbat (0) | Gnd (1) | Vbat (0) | Vbat (0) | 4 | BG2 |
| Vbat (0) | Gnd (1) | Vbat (0) | Gnd (1) | 5 | BG1 |
| Gnd (1) | Gnd (1) | Vbat (0) | Gnd (1) | 13 | 2H |
| Gnd (1) | Gnd (1) | Gnd (1) | Gnd (1) | 15 | INVALID |
| Gnd (1) | Vbat (0) | Gnd (1) | Gnd (1) | 11 | INVALID |
| Gnd (1) | Vbat (0) | Vbat (0) | Gnd (1) | 9 | INVALID |
| Vbat (0) | Gnd (1) | Gnd (1) | Gnd (1) | 8 | INVALID |
| Vbat (0) | Vbat (0) | Gnd (1) | Gnd (1) | 7 | INVALID |
| Vbat (0) | Vbat (0) | Gnd (1) | Gnd (1) | 3 | INVALID |
| Vbat (0) | Vbat (0) | Vbat (0) | Gnd (1) | 1 | INVALID |
| Vbat (0) | Vbat (0) | Vbat (0) | Vbat (0) | 0 | INVALID |

INPUT VARIABLES

| Variable | Definition | Domain |
|---|---|---|
| Init | This is the input flag to cause software initialization. Power-cycling of the micro-processor caused by any reason generates this flag. | T, F |
| Ig_Key | This variable contains information on the current value of the ignition key-switch. | RUN, START, OFF, ACC, UNKNOWN. |
| Ig_Key_Old | This variable contains information on the value of the ignition key-switch position in the last cycle. | RUN, START, OFF, ACC, UNKNOWN |
| Enc_Pos | This variable indicates the encoder position. Desired values are 2H, 4H, 4L, N. Additional positions include between-gear states and terminal positions. A preferred embodiment encoder codes are arranged as shown in Figure 4. | 2H, 4H, 4L, N, BGi (i=1, 2, 3, 4), INVALID, UNKNOWN |
| Enc_Pos_Old | The value of Enc_Pos in the previous repetition cycle. | Same as Enc_Pos |
| Enc_Pos_SC2 | This binary variable indicates whether the current encoder position code is SC2 (which is 0000). | T, F |
| Enc_Pos_SC2_Old | This binary variable simply has the value of Enc_Pos_SC2 from the previous execution cycle. At initialization, its value is F. | T, F. |
| Enc_Pos_Mod | This variable includes the distinction between a "BG" code on either side of 2H/4H/N/4L. The information of direction of travel is used to split, for example, BG2 into BG21 and BG22. It wasn't necessary to split BG1 and BG4 (since the Tcase rarely goes into the rail-region). | 2H, 4H, 4L, N, BG1, BG21, BG22, BG2?, BG31, BG32, BG3?, BG4, INVALID, UNKNOWN |
| Enc_Pos_Mod_Old | The prior value of Enc_Pos_Mod | See Enc_Pos_Mod |
| Upshift_Rly | Represents the state of the Upshift relay. If it is ON, the micro-end of the relay is grounded; open for OFF. | ON, OFF |
| Dnshift_Rly | Analogous to Up-Shift | ON, OFF |
| Dir_Travel | Represents the direction of travel of the motor. If the motor is turning at the moment, Dir_Travel is the direction of the motor, and if the motor is stationary, it is the direction of travel in the last round of motion. The value is OFF upon system initialization (since there is no "last" round of motion). | UP, DN, OFF |
| Upshift_Rly_CF | This flag corresponds to circuit-failure (CF) fault of the Up-shift relay-coil. It is the voltage of the line (relay-coil terminal) that is measured by the processor in a continuous manner (every execution cycle). With the relay not turned on by the controller, if the voltage reads (near) battery voltage, it indicates normal condition, whereas voltage near zero will indicate abnormal condition. This abnormal or fault condition is called "Circuit-Failure" here and will mean either of "open-circuit" and "short-to-ground" faults. | T, F |
| Upshift_Rly_SB | This flag corresponds to short-to-battery (SB) fault of the Up-shift relay-coil. This fault can be detected only when relay has been turned on (i.e., grounded by the processor). | T, F |
| Dnshift_Rly_CF | The meaning and explanation are analogous to Upshift_Rly_CF. | T, F |
| Dnshift_Rly_SB | The meaning and explanation are analogous to Upshift_Rly_SB; domain is identical. | T, F |
| Enc_Pwr_SG | When Short-to-Ground (SG) fault on encoder power line is detected by the hardware, this flag is set. | T, F |
| Enc_Pwr_Loss_Fault | When set, this indicates loss of power to the encoder. | T, F |
| Enc_Pwr_Loss_Fault_Old | This is the value of Enc_Pwr_Loss_Fault in the previous execution cycle. | T, F |

FIGURE 7

OUTPUT VARIABLES

| Enc_Changed_Unwarranted | A fault flag. When set, indicates that the encoder value changed when it was not supposed to. | T, F |
|---|---|---|
| Enc_Chnl_Fault | This fault is generally declared when motor motion takes places in the presence of hard or intermittent encoder channel failure. | T, F |

INTERNAL VARIABLES

| Enc_Pos_Adj_Up | This variable holds the value of valid encoder position which is next "notch" in the UP direction, as compared with the encoder position in the previous execution cycle. | 2H, 4H, N, BGi(i=1,2,3,4), NONE |
|---|---|---|
| Enc_Pos_Adj_Dn | This variable holds the value of valid encoder position which is next "notch" in the DN direction, as compared with the encoder position in the previous execution cycle. | 2H, 4H, N, BGi(i=1,2,3,4), NONE |
| Enc_Pos_Next | This is the value of encoder position, with the value in the last cycle as the reference, as the next notch in the direction of travel. | 2H, 4H, N, BGi(i=1,2,3,4), NONE |
| Restart_Observer | This is the input that causes re-initialization of the observer (only). | T, F |
| Enc_Chnl_Fault_Index | This index represents the "health" of the encoder channels. Depending on the encoder codes read, as against expected, the value is increased, decreased, or kept unchanged. | Positive integer |
| P4_to_Add | This variable is used in Process W2 to increase Enc_Chnl_Fault_Index in a geometrical manner. P4_to_Add is the value to be added to the index in the current cycle and its value is P4 times 2 raised to a positive integer power. | |

CALIBRATABLE PARAMETERS

| P1 | This is a parameter associated with encoder index. When a "wrong" but valid encoder code is received during shifting, the index is increased by P1. | 500 |
|---|---|---|
| P2 | When the right encoder code is received during shifting, the index is decreased by P2. | 750 |
| P4 | With the shift in progress, if an INVALID encoder code is received once then the encoder index is increased by P4. If the INVALID codes are received in successive cycles then incrementing is done in a geometrical series starting with P4. | 8 |
| Enc_Index_Threshold | This is the value for the encoder-channel-fault-index at which Encoder-Channel-Fault is declared. | 2500 |
| Timer T10 | Function is to disable declaring Enc_Changed_Unwarranted fault looking at encoder change in this period at the end of the shift or shift-attempt. Also, the reference value for the encoder code (Enc_Pos_Initial) is updated continuously in this period. The rationale is that there might be some mechanical bouncing or settling taking place once the relay has been turned off at the end of the shift or shift-attempt. | 100 ms |
| Timer T11 | The purpose of T11 is to allow transients in the encoder code to settle down at power-up without declaring any fault. Also, upon power-up/system-reset the system may be trying to shift to a proper state (e.g, 2H) from a rail and the encoder may give some invalid codes in the process of pulling off the rail. It is only meaningful to not set any faults in the noted initialization. | 2 seconds |

FIGURE 8

OBSERVER FOR TRANSFER CASE FAULT DETECTION IN A FOUR-WHEEL DRIVE SYSTEM

FIELD OF THE INVENTION

The present invention relates to an electronically shifted four wheel drive system for an automotive vehicle, and more particularly to a system and method for detecting faults in such a four wheel drive system.

BACKGROUND OF THE INVENTION

Four wheel drive systems include Electronically Shifted and mechanically shifted four wheel drive systems. Certain of such electronically controlled systems may be shifted on the fly; meaning thereby there is a microprocessor that controls the shifting. Alternatively, there are Mechanical shift on the fly (MSOF) systems that operate with a manual lever and don't have an electronically controlled unit.

In an electronically controlled system, certain faults are detected and the microprocessor controls the shift device to take appropriate action in the presence of such faults. However, encoder faults are typically not addressed in a robust manner. It would be desirable to provide a system and method which adequately detects encoder faults in a robust manner.

SUMMARY OF THE INVENTION

Accordingly, the present invention provides a system and method to detect encoder faults. In a system according to the present invention, a micro-processor is provided to enables accurate, safe, reliable, and fault-tolerant operation. More particularly, the present invention provides observers to diagnose two faults in the transfer case assembly, namely, when the encoder value changes when not warranted (Enc__Changed__Unwarranted) and an error in the encoder channel (Enc__Chnl__Fault).

According to the present invention, a system and method are provided for monitoring the state of a transfer case. A first encoder value is established corresponding to a preselected position of the transfer case. Thereafter it is determined that the shift relays are not energized, and that a first predetermined time period has elapsed since one of the relays was turned off after a shift-attempt. It is further established that a second time period has elapsed since the controller was initialized. A current value of the encoder is compared to the first value. When the current encoder value is not the same as the first value and it is determined that no request was made to change the position of the transfer case a fault flag is set, named Enc__Changed__Unwarranted. If all of the above determinations are not made, the fault flag is not set.

The second fault flag Enc__Chnl__Fault is set with an index based algorithm which manipulates an index in a recursive manner when a relay is on to accomplish a shift. Wrong but valid encoder code received during the shift increments the index while anticipated in-sequence valid value decrements it. The index is increased in a geometrical manner when invalid codes are received in successive cycles during a shift. When the index reaches a preset threshold value during or at the end of a shift, the fault flag Enc__Chnl__Fault is set.

Advantages of the present system include detection of encoder channel faults, including open circuits, shorts, and power failures, while preventing false faults immediately following a shift or immediately after power is turned on to the controller. The present invention can detect an open/short fault in a certain encoder-channel, which would otherwise leave the encoder code as unchanged or may change it to another valid code. As the shift motor rotates, any channel fault will be detected by the present invention. Moreover, the observer responds appropriately to transient faults. When relays are off and the encoder changes due to a fault, the fault flag (Enc__Changed__Unwarranted) is set and as soon as the physical fault in the encoder goes away, the said fault is reset. When the motor is turning during a shift maneuver and occasional wrong encoder codes are received due to noise or intermittent physical faults, the intelligent index-based algorithm does not set the fault flag (Enc__Chnl__Fault) unless the severity warrants it.

BRIEF DESCRIPTION OF THE DRAWINGS

FIG. 7 is a table of input variables for the state machine of FIG. 5.

FIG. 8 is a table of output variables, internal variables, and calibratable parameters for the state machine of FIG. 5.

DETAILED DESCRIPTION OF THE PREFERRED EMBODIMENTS

Figure 1:
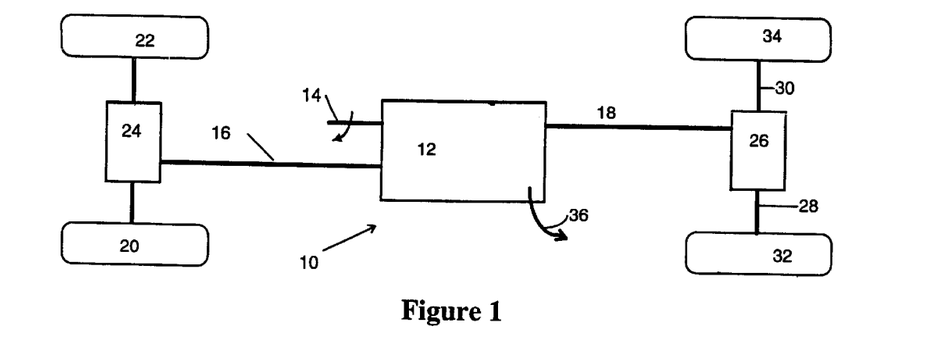
FIG. 1 is a schematic representation of a four wheel drive motor vehicle according to the present invention.

FIG. 1 provides a simplified schematic representation of the primary mechanical parts of a four wheel drive (4×4) vehicle 10. The main mechanical component of the four wheel drive system is a transfer case 12. The transfer case 12 has three shafts 14, 16, 18 connected thereto, namely an input shaft 14 that receives power and torque from the prime-mover (not shown, including the engine and transmission), the front driveshaft 16, and the rear driveshaft 18. The front driveshaft 16 is connected to the front wheels 20, 22 through a front differential 24. Similarly, the rear driveshaft 18 is connected to a rear differential 26, the output of which is split into left and right half shafts 28, 30, respectively, that drivably connect to the rear wheels 32, 34.

As known to one skilled in the art, the transfer case 12 is shiftable into various modes, including 2WD (two-wheel-drive) with a high gear ratio, 4WD (four-wheel-drive) with a high gear ratio, or 4WD (four-wheel-drive) with a low gear ratio. The names of these gears are short-handed as "2H", "4H", and "4L", respectively. The transfer case 12 preferably further includes a Neutral (N) position to decouple both front axle and rear driveshafts 16, 18 from the input shaft 14. The electrical connections 36 are represented schematically in FIG. 1.

Figure 2:
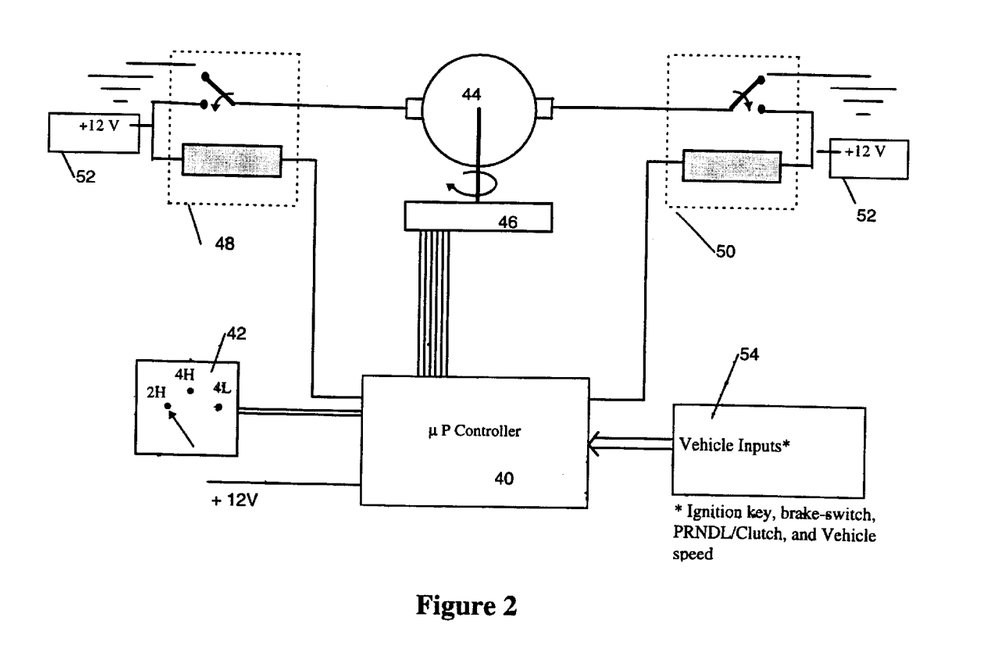
FIG. 2 is a schematic representation of an electrical system for the four wheel drive system of FIG. 1.

FIG. 2 schematically represents the electrical components and their interconnections for the system. A micro-processor controller 40 (referred herein as either the controller or processor) is the central device that makes the whole system operate. The control strategy resides in the processor 40 in form of software in a known manner.

The driver commands the transfer case 12 to a selected mode through a known Mode Select Switch 42 (MSS). The MSS 42 sends a signal based on the driver's request to the processor 40. The transfer case motor 44 and encoder 46 are physically part of the transfer case 12 itself shown in FIG. 1. The encoder 46 is preferably an absolute-position type encoder that sends information to the processor 40 about the exact position of the motor 44 and thereby the current gear of the transfer case 12. Two relays 48, 50 are provided for the transfer case motor 44, a first relay 48 for up-shift and the other relay 50 for down-shift. Each relay 48, 50 has one end connected to a battery 52 and the other end is connected to the processor 40. The processor 40 grounds a relay 48, 50 in order to energize the relay 48, 50, and, in effect, to turn the motor 44 in a given direction corresponding with the selected mode of the MSS 42.

Figure 3:
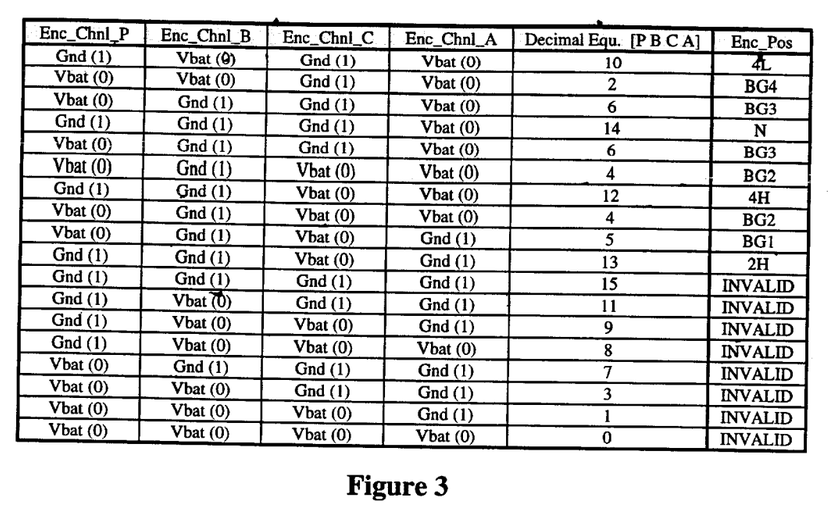
FIG. 3 is a Gray Code Table for the Encoder States for the encoder of FIG. 2.
Figure 4:
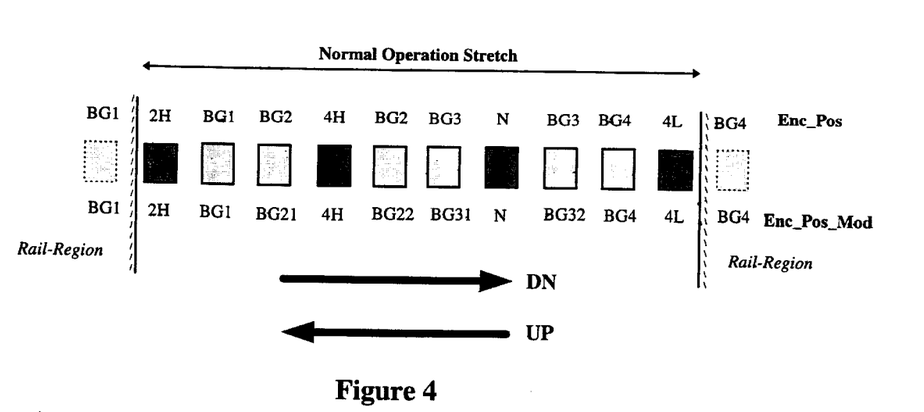
FIG. 4 is a schematic representation of the Transfer Case States as Seen by the Encoder of FIG. 2 and the convention used for the direction of the motor.

The values of the encoder position are described here with respect to a preferred encoder exemplified by FIG. 3, which illustrates the encoder position gray code. In this application, as illustrated in FIG. 3, "BG" stands for "Between Gear". It is noteworthy that on each side of 2H, 4H, N, and 4L, the codes are identical. 2H, 4H, N, and 4L have P-chnl as GND and BG1, BG2, BG3, and BG4 have P-chnl as Vbat. UNKNOWN value exists until debouncing is complete, starting from initialization. When the processor wakes up from sleep mode, the encoder reading starts from UNKNOWN value and goes through debouncing. The debouncing period is a length of time to wait before encoder values are read so as to avoid erroneous input. Preferably, the "awake mode" is any time in which the controller is not in sleep mode or turned "off".

As shown in FIG. 1, the processor 40 also receives a plurality of vehicle inputs 54, including the position of the ignition key, whether the brake is engaged (from the brake switch), in which position the automatic transmission is engaged or whether the clutch is depressed in a manual transmission, the vehicle speed, and others. First, the Ignition key state (RUN, START, OFF, ACC) is input into the processor 40 and is used in the control logic. The controller 40 also needs to know whether the driver's foot is on brake, which gear of the automatic transmission has been selected (or, in case of manual transmission, whether clutch is pressed), and the vehicle speed value in order to determine whether shifting through transfer case Neutral (shifting between 4H and 4L) should be performed.

The present invention primarily addresses two faults for which identification algorithms are provided. The first fault is Enc_Changed_Unwarranted, which is described as follows. The encoder 46 is not supposed to change unless the motor 44 has been commanded to move by energizing one of the relay-coils 48, 50. Enc_Changed_-Unwarranted fault flag is preferably set due to any of the following failures taking place while no relay was commanded on by the micro-processor:

Open-circuit (OC) fault in an encoder channel

Short-to-ground (SG) fault on an encoder channel

Short-to-Battery (SB) fault on an encoder channel

Power-failure, i.e., power line to encoder open- or short-circuited to ground.

In a preferred embodiment, the OC, SG, or SB fault will cause Enc_Changed_Unwarranted fault flag to be set only if the encoder value gets changed because of the fault. It can be seen that sometimes a given type of fault in a given channel will be transparent while the motor is at a given position. Power failure will invariably change the encoder code.

If the motor moved unwarranted due to a relay failure and thus the encoder changed, those situations are also included in this fault flag. Two related causes (failures) include an instance where the Micro-end of the coil of one of the relays short-circuited to ground, and when contacts of one of the relays is frozen closed to battery connection point.

The second fault addressed by the present invention is called Enc_Chnl_Fault. Enc_Chnl_Fault is declared while the motor turns during shift-mission(s). This fault flag is caused by encoder channel failure(s), namely, OC, SG, or SB and is set only while the motor is in motion. If the encoder channel failure takes place with relays off, in some cases, the fault will be a transparent one and Enc_Changed_Unwarranted flag will not be set. In such cases, when the motor is commanded to move for accomplishing shifts, incorrect/illogical codes received will set the Enc_Chnl_Fault fault flag. The other possibility is that while the motor is moving, the encoder failure takes place and as stated, improper codes set the fault flag.

In a preferred embodiment, Enc_Chnl_Fault is diagnosed with an index-based recursive algorithm that tracks the sanctity and validity of the encoder code as the motor turns to perform shifts. The reason why the identification of this fault is not straightforward is that it is possible that an open/short fault (OC, SG, SB) in a certain encoder-channel can leave the encoder code as unchanged or may change it to another valid code. Nevertheless, as the motor rotates, any channel fault will be detected by the present invention. However, there might be a period when the motor rotates with an encoder channel failure but Enc_Chnl_Fault not yet declared. The algorithm design of this invention has minimal delay in observation and declaration. It might also be noted that transitory faults in encoder channels (due to electromagnetic interference, for example) will be filtered through this observer algorithm. For the purpose of the present invention description, the necessary variables are defined in the tables provided in FIGS. 7 and 8.

The present invention will be described with reference to the state machine of FIG. 5 and the blocks provided therein as defined in FIG. 6. It is noted that the state machine in FIG. 5 includes three states 412, 436, 458 and a number of transitions, each transition including an event and an action, as described below. A detailed explanation of a state machine is provided in my copending application, 08/999, 512, which is incorporated herein by reference in its entirety.

Figure 5:
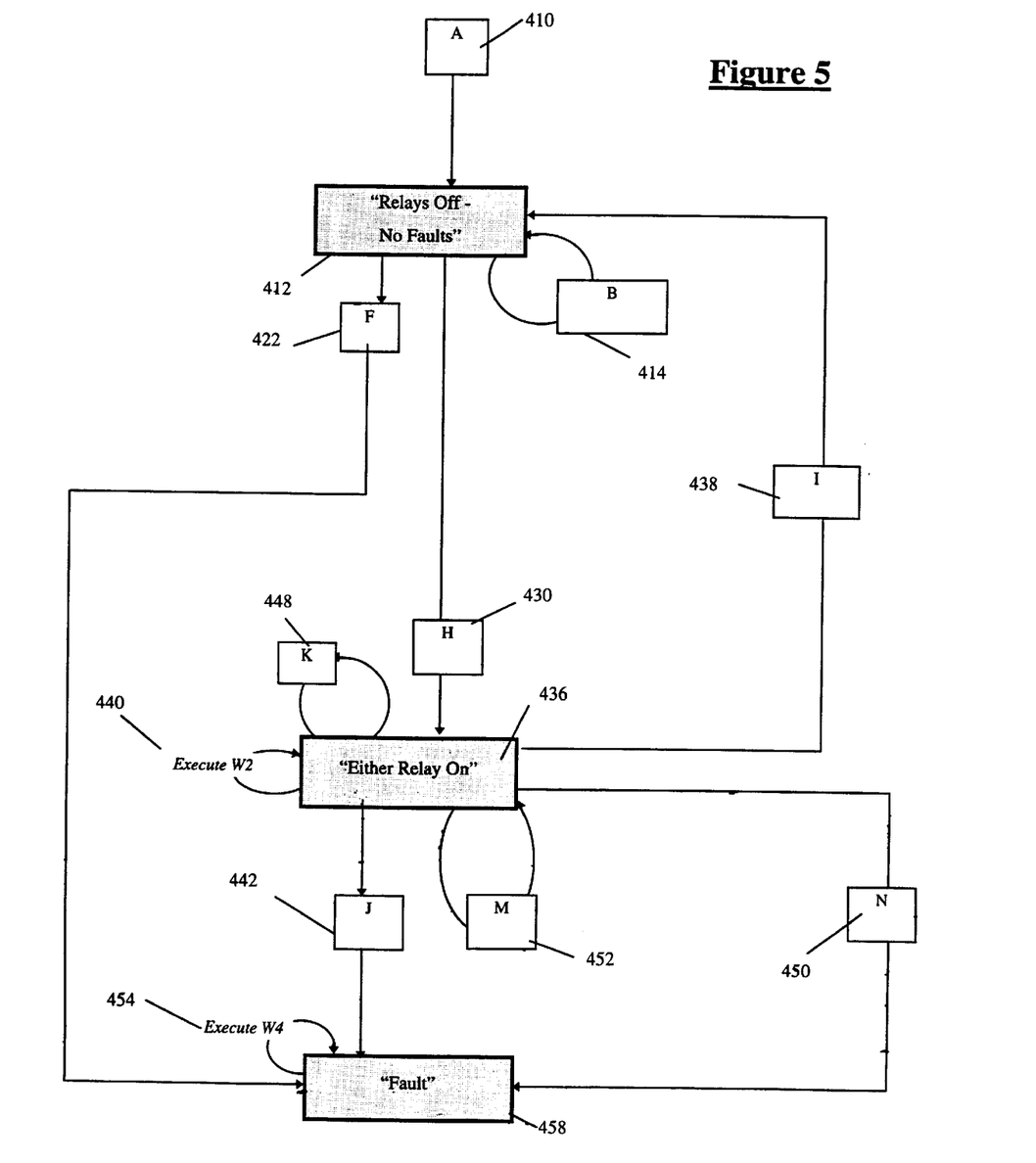
FIG. 5 is a state machine for the system of FIG. 1.
Figure 6:
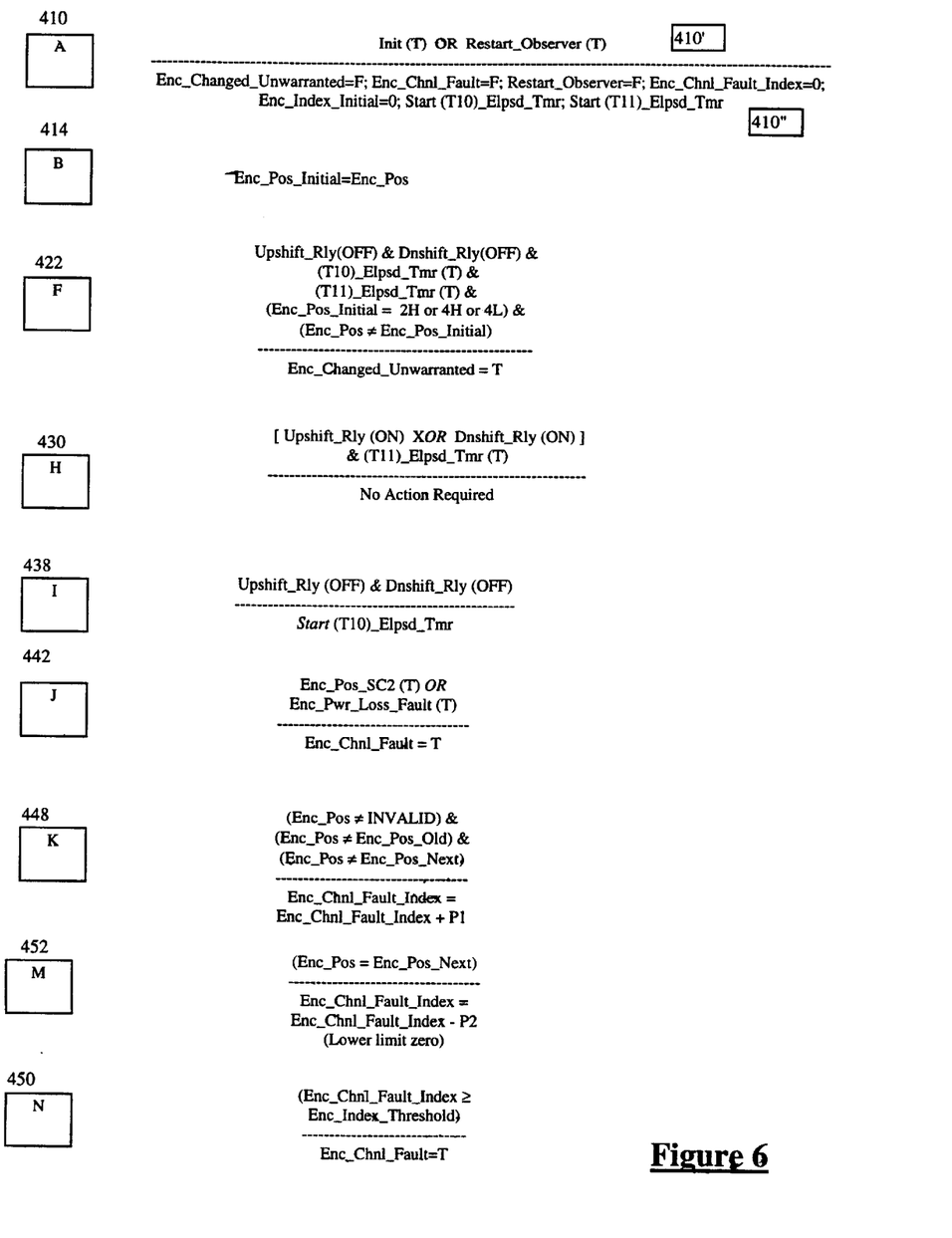
FIG. 6 defines several of the blocks provided in the state machine of FIG. 5.

As shown in FIGS. 5 and 6, at transition Block A, indicated at 410, upon the occurrence of the event 410' of initialization or a restart, an action 410" occurs, whereafter all variables generated within the observer are started off from default values. This action 410" includes clearing both faults detected by this observer and resetting associated variables. The timers T10 and T11 are started. A list of conditions that cause the event 410' of Block A to be run and the observer to be reset is given below:

Battery power-loss and power-regain

Micro-Controller module power-cycling

Micro-processor reset due to any reason, such as watch-dog timer condition or on-the-fly reset due to EMI     Auto-resetting of faults as generated by the Process W4

The first three of the above conditions cause Init=T and the last condition causes Restart_Observer=T.

After Block A 410 is satisfied, the State 1 412 is entered. State 1 412 is the state labeled "Relays Off—No Faults". In State 1 412, both relays 48, 50 are "off" and no faults were indicated. While the state of residence is the State 1 (412), Block B 414 is continually run as a self-transition loop. The function of Block B 414 is to update the variable Enc_Pos_Initial, equating it to Enc_Pos.

While in the State 1 412, when the condition portion (event) of block F 422 is TRUE, a transition from State 1 to State 3 takes place, setting the fault flag Enc_Changed_ Unwarranted. As noted in FIG. 6 at 422, several constituent conditions must be met, as noted below:

Enc_Pos_Initial is encoder value corresponding to one of the main stops (2H/4H/4L) and Enc_Pos (current value) is different from it marking an inadvertent and unwanted change.

Both relays are off.

T10 period has elapsed since the last time relay was turned off as part of a shift or a shift-attempt.

T11 period has elapsed since initialization/restart condition.

As further shown in FIG. 5, if Block F 422 is not met and the State 1 412 is present, when either relay is turned on to perform a shift, the event of block H 430 is met and entry is made to State 2 436. State 2 436 is the state labeled "Either Relay On". The other event that must occur 430 is the expiration of the T11 period from start-up.

While in State 2 436, after the relays are turned "off", Block I 438 is met. This block 438 enables transition from State 2 436 to State 1 410 at the end of a shift. During block I 438, when both relays are off, T10 timer is started and exit is made to State 1 412.

If while in State 2 436, Block J 442 may be met when an encoder power-loss fault takes place or encoder code is SC2 (0000). In this case of Block J 442, exit to State 3 is made and the index is reset. The purpose of the index is to detect a fault of the encoder channels only. In such a case the index is zeroed 442. As explained below in "Step 2", Enc_Pwr_ Loss_Fault is synonymous with Enc_Pwr_SG which is detected by the hardware. An open circuit fault on encoder power line is, however, not detected directly. The latter causes the encoder code to become all zeros (SC2). This explains the two OR'd conditions of this block 442. Either SG or OC fault on the power line sends control to the "Fault" state.

While in State 2 436, Block K 448 is continually run. Block K 448 is run with a shift in progress, while the encoder value is valid, but the encoder value is neither the prior value, nor the next anticipated value. The next anticipated value is inferred from the direction of motor rotation based on the current value and knowing the adjacent positions. In this case, the index is incremented by P1. If an incorrect code is detected, this indicates some problem with one or more encoder channel(s) and is reflected in the encoder channel fault index ("index") by adding the P1 value as shown in FIG. 6 at Block K 448.

While in State 2 436, Block M 452 is also continually run. With the control in State 2, if the new encoder code received is Enc_Pos_Next then Block M 452 decrements the index by the value P2, as shown in FIG. 6. The rationale is that this "correct" code indicates the probability of the fault having disappeared. It may also be noted that when decrementing, a ceiling of zero value is imposed as the index is meant to be non-negative integer number.

While in the State 2 436, if the index equals or crosses the set threshold value, then Block N 450 is met and the Encoder-Channel-Fault is declared (Enc_Chnl_Fault=T) and the control is sent to the "Fault" State 3 458. State 3 458 is the state labeled "Fault".

The states 412, 436, 458 have obvious meanings. Whenever any fault is recognized and registered by the observer, the control is sent to State 3 458. State 2 436 has the recursive index-based algorithm built in it to declare Enc_ Chnl_Fault. State 1 412 is the state where system goes from the start-up/restart condition and, indeed, most of the time, that's where the control resides.

As provided in Blocks F 422 and H 430, after the start-up/restart condition 410, for first T11 period, transition to State 3 will not be made even though an unwarranted encoder change has been registered. Also, transition to State 2 (to enter the recursive index-based algorithm for Enc_ Chnl_Fault) from State 1 is not made in this period (Block H 430). Reasons are the following:

When power is getting set-up in the system components, encoder may give meaningless values.

If the motor was railed before the initialization/restart condition, the shift-logic automatically shifts the motor out of the rail to proper position and somehow, the encoder is known to give invalid codes when pulling out of the rail sometimes.

Similarly, as provided in the Block F 422, for first T10 period after turning a relay off at the end of a shift-attempt, transition to State 3 458 will not be made from State 1 412. The reason is that mechanical bouncing and settling may take place giving several different encoder values after the relay is turned off.

While the control is in State 1 412, an encoder power fault (OC or SG) will cause the encoder to change and Enc_ Changed_Unwarranted fault will be set. If the control is in State 2 436, the same fault will simply reset the index and cause the exit. In both cases, the control is transferred to State 3 458, the "Fault" state.

As indicated in Block A 410, when the processor wakes up from sleep mode, the encoder reading starts from UNKNOWN value and goes through debouncing, as stated earlier. The encoder reading becomes INVALID during the sleep mode (since power to encoder and the controller are turned off) but the logic is not run during the sleep mode. At wake-up (i.e. exit form the sleep mode), the encoder position variable starts from UNKNOWN and then takes the proper value after debouncing period. It is thus clear from the operation of the state machine that owing to the sleep-wake up cycling, index is not incremented and no fault is set.

While in State 2 436, a "wrong" encoder code increases the index 448 and a "right" code decreases the index 452. A hard encoder channel failure will increase the index to the threshold value and the amount of time or the number of shifts needed depends on the type of fault and the specific shifts performed. In the case of intermittent encoder channel failures, if the index is above zero but below the threshold value and the fault goes away then performing shifting will clear the index.

The algorithm will be described now in greater detail in three steps.

Step 1 This step is the preparatory one and it simply generates some variables to be used in the main steps. The table below is used to generate Enc_Pos_Adj_ Up and Enc_Pos_Adj_Dn.

| Enc_Pos_Mod_Old | Enc_Pos_Adj_Up | Enc_Pos_Adj_Dn |
| --- | --- | --- |
| 2H | BG1 | BG1 |
| BG1 | 2H | BG2 |
| BG21 | BG1 | 4H |
| 4H | BG2 | BG2 |
| BG22 | 4H | BG3 |
| BG31 | BG2 | N |
| N | BG3 | BG3 |
| BG32 | N | BG4 |
| BG4 | BG3 | 4L |
| 4L | BG4 | BG4 |
| BG2? | NONE | NONE |

-continued

| Enc_Pos_Mod_Old | Enc_Pos_Adj_Up | Enc_Pos_Adj_Dn |
|---|---|---|
| BG3? | NONE | NONE |
| INVALID or UNKNOWN | NONE | NONE |

After the above values are generated, the following table is used to generate an Enc_Pos_Next value which is the next valid encoder value knowing the direction of the motor rotation.

| Dir_Travel | Enc_Pos_Next |
|---|---|
| UP | Enc_Pos_Adj_Up |
| DN | Enc_Pos_Adj_Dn |
| UNKNOWN | NONE |

Step 2 The fault flag Enc_Pwr_Loss_Fault is set if there is any pre-diagnosed encoder power-loss fault. Also, the value of this fault flag from the previous cycle is stored in a variable named Enc_Pwr_Loss_Fault_Old.

Enc_Pwr_Loss_Fault_Old =Enc_Pwr_Loss_Fault (Initialization: Enc_Pwr_Loss_Fault_Old =F )
Enc_Pwr_Loss_Fault =Enc_Pwr_SG Step 3 This step furnishes the diagnostic observer and its outputs are Enc_Changed_Unwarranted and Enc_Chnl_Fault. The observer is provided in the state machine shown in FIG. 5. The observer primarily uses two processes, W2 and W4 440, 454.

The process W2 440 penalizes the index when encoder gives an invalid value. If W2 is executed with encoder giving invalid values multiple cycles in a row then the index is incremented in geometric fashion every time W2 440 is executed. The reason is that a real fault in one or several encoder channel(s) is indicated. For example, if the motor is in motion during a shift and invalid codes are received in successive execution cycles then the index is increased by these amounts in the same sequence: 8, 16, 32, 64, 128, 256, 512, 1024, 2048. Starting from zero, the index will reach the threshold in 9 cycles.

The W2 440 process includes the following steps:

```
IF    Enc_Pos = INVALID
THEN
    IF    Enc_Pos_Old = INVALID
        THEN    P4_to_Add = 2 * P4_to_Add
        ELSE    P4_to_Add = P4
    ENDIF
    IF    Enc_Chnl_Fault_Index < Enc_Index_Threshold
    THEN    Enc_Chnl_Fault_Index =
Enc_Chnl_Fault_Index + P4_to_Add
        ENDIF
ENDIF
```

While in State 3 458, the process W4 454 is continually run. W4 454 provides for auto-resetting of some faults. The three conditions for which resetting is done through W4 454 are the following:

In the condition where Enc_Chnl_Fault is not set and with both relays off, the encoder value is returned to Enc_Pos_Initial value.

If the encoder code was SC2 (0000) in the previous cycle but changed to a different value other than SC (0000) in the present cycle, the encoder value is returned to Enc_Pos_Initial value.

If the encoder power loss fault was present in the last execution cycle but this fault is not present in the current cycle, the encoder value is returned to Enc_Pos_Initial value.

W4 454 includes the following steps:

```
IF    [ (Enc_Pos=Enc_Pos_Initial) & Enc_Chnl_Fault (F) &
        Upshift_Rly (OFF) & Dnshift_Rly (OFF) ] OR
        [ Enc_Pos_SC2 (F) & Enc_Pos_SC2_Old (T) ] OR
        [Enc_Pwr_Loss_Fault (F) & Enc_Pwr_Loss_Fault_Old (T)
        ]
THEN    Restart_Observer = T
ENDIF
```

If during State 3 458 W4 454 restarts the observer, then Block A 410 is met and the cycle returns as illustrated in FIG. 5.

Although preferred embodiments of the present invention have been disclosed, various changes and modifications may be made without departing from the scope of the invention as set forth in the appended claims.

We claim:

1. A method for detecting faults in a position sensing device of a transfer case shift motor in an electronic shift system in a motor vehicle having a controller for operating the motor; the method comprising the steps of:

determining a first value of the sensing device, the first value corresponding to a preselected transfer case position;

determining that the motor is not energized by the controller;

determining that a first predetermined time period has elapsed since the motor was de-energized after a shift-attempt;

determining that a second predetermined time period has elapsed since the controller was initialized;

determining a current value of the sensing device;

determining the current value of the sensing device is not the same as the first value; and upon all of the above determinations being made, setting a first fault flag corresponding to an unwarranted sensing device change fault, otherwise not setting said first fault flag.

2. A method according to claim 1, further comprising the steps of:

determining the controller experienced a sleep mode;

setting the current value of the sensing device to UNKNOWN after the controller wakes from the sleep mode;

running the sensing device through debouncing;

determining the controller is in an awake mode and thereafter performing the following steps:
 waiting a debouncing time period; and
 determining if the current value is INVALID or UNKNOWN and thereafter setting a first and second anticipated sensing device values to NONE.

3. A method according to claim 2, further comprising the steps of upon determining the current value is not INVALID and not UNKNOWN, and thereafter determining a first and second anticipated value for the sensing device for a first and second direction of motor motion, respectively.

4. A method according to claim 1, further comprising the steps of:

determining the first time period has not expired after the motor is de-energized after a shift-attempt;

determining the second time period has not expired after starting the controller; and upon making the above determinations, thereafter updating the first value of the sensing device to the current value of the sensing device.

5. A method according to claim 1, wherein the first time period comprises approximately 100 ms.

6. A method according to claim 1, wherein the second time period comprises approximately two seconds.

7. A method according to claim 1, further comprising the steps of:

waiting the second time period after the controller is started;

thereafter determining the controller has commanded a shift of the motor; and upon waiting the second time period and determining that the motor has been energized by the controller to perform a shift, setting an index for the sensor.

8. A method according to claim 7, further comprising the steps of determining the index has a value equal to or greater than a threshold value, thereafter setting a second fault flag corresponding to a sensor channel fault.

9. A method according to claim 8, wherein the index has a value of a non-zero positive number and the threshold value for the index is 2500.

10. A method according to claim 9, further comprising the steps of:

determining the motor is de-energized by the controller;

determining the index has reached the threshold value substantially simultaneous with the controller de-energizing the motor; and thereafter setting the second fault flag before another shift is attempted.

11. A method according to claim 10, further comprising the steps of:

determining the sensor has a value other than 0000;

determining the sensor value in a cycle immediately prior to the current cycle was 0000; and thereafter resetting both fault flags and zeroing the index.

12. A method according to claim 8, further comprising the steps of:

waiting the second time period interval after the controller is started;

determining that a power line to the sensor has sustained a short-to-ground fault while the motor was energized to perform a shift attempt; and thereafter immediately setting the second fault flag without waiting for index to reach threshold.

13. A method according to claim 8, further comprising the steps of:

waiting the second time period interval after the controller is started;

determining that a power line to the sensor has sustained an open-circuit fault while the motor was energized to perform a shift attempt; and thereafter immediately setting the second fault flag without waiting for index to reach threshold.

14. A method according to claim 10, further comprising the steps of:

determining the sensor does not have a power fault in the current cycle;

determining the sensor had a power fault in the previous cycle; and thereafter resetting both fault flags and zeroing the index.

15. A method according to claim 10, further comprising the steps of:

determining that the first fault flag is set and the second fault flag is not set;

determining that the motor is not energized;

determining that the current encoder value has become the same as the first encoder value; and upon the above determinations being made, thereafter resetting both fault flags and zeroing the index.

16. A method according to claim 7, further comprising the steps of:

determining whether the current value of the sensor is invalid;

determining whether the prior sensor value was invalid; and upon determining that the current sensor value is invalid and a previous sensor value is valid, adding a first fixed value to the index; and upon determining that both the current and prior encoder values are invalid, continually monitoring the sensor value and geometrically incrementing the index while the current sensor value remains invalid, until a threshold is reached.

17. A method according to claim 16 wherein the first fixed value is approximately 8, and said geometric incrementing is performed by a ratio of approximately 2.

18. A method according to claim 16 further comprising the steps of:

determining an anticipated next sensor value;

determining the current sensor value is not invalid;

determining an immediately prior sensor value is not the same as the current sensor value;

determining the current sensor value is not equal to the anticipated next sensor value; and upon all of the above conditions being met, incrementing the index by a second fixed value.

19. A method according to claim 18 where the second fixed value is approximately 500.

20. A method according to claim 19, further comprising the steps of:

determining the current sensor value is equal to the anticipated next value for the sensor;

upon the above condition being met, decrementing the index by a third fixed value.

21. A method according to claim 11, further comprising the step of preventing the index from having a value less than zero.

22. A method according to claim 21, wherein the third fixed value is approximately one and a half times as large as the second fixed value.

* * * * *